United States Patent
Rao (10) Patent No.: US 8,069,160 B2
(45) Date of Patent: Nov. 29, 2011

(54) SYSTEM AND METHOD FOR DYNAMICALLY MONETIZING KEYWORD VALUES

(75) Inventor: Supreeth Hosur Nagesh Rao, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 527 days.

(21) Appl. No.: 12/344,005

(22) Filed: Dec. 24, 2008

(65) Prior Publication Data

US 2010/0161613 A1 Jun. 24, 2010

(51) Int. Cl.
*G06F 17/30* (2006.01)
(52) U.S. Cl. ........... 707/706; 707/696; 707/723; 705/37
(58) Field of Classification Search .......... 707/696, 707/706, 723, 709, 711; 705/7.37, 14.46, 705/14.6, 37
See application file for complete search history.

(56) References Cited

U.S. PATENT DOCUMENTS

| 7,146,416 | B1 | 12/2006 | Yoo et al. | |
| 7,174,346 | B1 * | 2/2007 | Gharachorloo et al. | 1/1 |
| 7,254,580 | B1 * | 8/2007 | Gharachorloo et al. | 1/1 |
| 7,437,353 | B2 * | 10/2008 | Marmaros et al. | 1/1 |
| 7,580,929 | B2 * | 8/2009 | Patterson | 1/1 |
| 7,581,227 | B1 * | 8/2009 | Lawrence et al. | 719/318 |
| 7,711,679 | B2 * | 5/2010 | Patterson | 707/715 |
| 7,725,453 | B1 * | 5/2010 | Chen et al. | 707/711 |
| 7,818,324 | B1 * | 10/2010 | Held et al. | 707/741 |
| 2003/0004781 | A1 | 1/2003 | Mallon et al. | |
| 2004/0249713 | A1 | 12/2004 | Gross | |

* cited by examiner

*Primary Examiner* — Cheryl Lewis
(74) *Attorney, Agent, or Firm* — Brinks Hofer Gilson & Lione (57) ABSTRACT

A system and method for dynamically monetizing keyword values based on a correlation between one or more indices. The method includes generating a first index for a subject being searched by users via web server, and a second index for the subject based on a corresponding level of popularity. The first index is correlated with the second index to predict a future second index for the subject based on the first index.

27 Claims, 5 Drawing Sheets

SYSTEM AND METHOD FOR DYNAMICALLY MONETIZING KEYWORD VALUES

SUMMARY

The present application provides a system and method for dynamically monetizing keyword values based on a correlation between two or more indices. The system includes a first index module and a second index module associated with a website. The first index module may be configured to generate a first index for a subject being searched by users via a web server associated with the website. The first index may be based on a total amount of web documents the web server generates in response to the search request and an access frequency associated with each web document. The second index module may be configured to independently generate a second index for the subject based on a corresponding level of popularity. An analysis engine in communication with the first index module and the second index module may be configured to correlate the first index with the second index. Based on the correlation between the first index and the second index, the analysis engine may be configured to approximate a future second index for the subject.

Further objects, features and advantages of this invention will become readily apparent to persons skilled in the art after a review of the following description, with reference to the drawings and claims that are appended to and form a part of this specification.

DETAILED DESCRIPTION

With the advent of the Internet, techniques have been developed to determine the popularity of search terms for various monetization purposes, such as marketing products and services via online-advertising. A search engine such as Yahoo! or Google, for example, may include a system and/or method for processing a search index in order to track the number of searches conducted for a given term. Such a search engine may also include a system and/or method for processing a "Buzz" Index configured to measure online interest in a topic, subject, product, etc. Yahoo!, for example, provides a Yahoo! Buzz Index which identifies search trends on the Yahoo! network and indexes those trends into daily posts for public viewing on the Yahoo! Buzz website (buzz.yahoo.com). Yahoo!'s Buzz Index is generally based on a total number of users searching a certain subject on the Yahoo! network. For each subject, the Yahoo! Buzz Index assigns a normalized score representing the percentage of total Yahoo! users searching that subject on a given day. Additional details of the Yahoo! Buzz Index are disclosed in U.S. Patent Publication No. 2003/0004781 to Mallon et al., and U.S. Pat. No. 7,146,416 to Yoo et al. (hereinafter referred to as "Yoo"), which are commonly assigned to the assignee of the present application and are incorporated herein by reference in their entirety for all purposes.

One advantage of the Yahoo! Buzz Index is related to Internet-based advertising. For instance, advertisers can determine which search terms they wish to bid for based on the popularity of subjects associated with such terms, as indicated by Yahoo!'s Buzz Index. Similarly, Yahoo! utilizes the Yahoo! Buzz Index to assign price values to search terms. While it is clear that Yahoo!'s Buzz Index is a useful tool for identifying popular topics, it would also be beneficial if there existed a system and/or method for predicting which subjects would yield a higher Buzz score in the future. For instance, if the popularity for a given subject can be predicted before the market for that subject is saturated, search terms associated with that subject can be monetized. Accordingly, predicting a higher Buzz score for a particular subject may be useful in the process of marketing and other monetization techniques.

Figure 1:
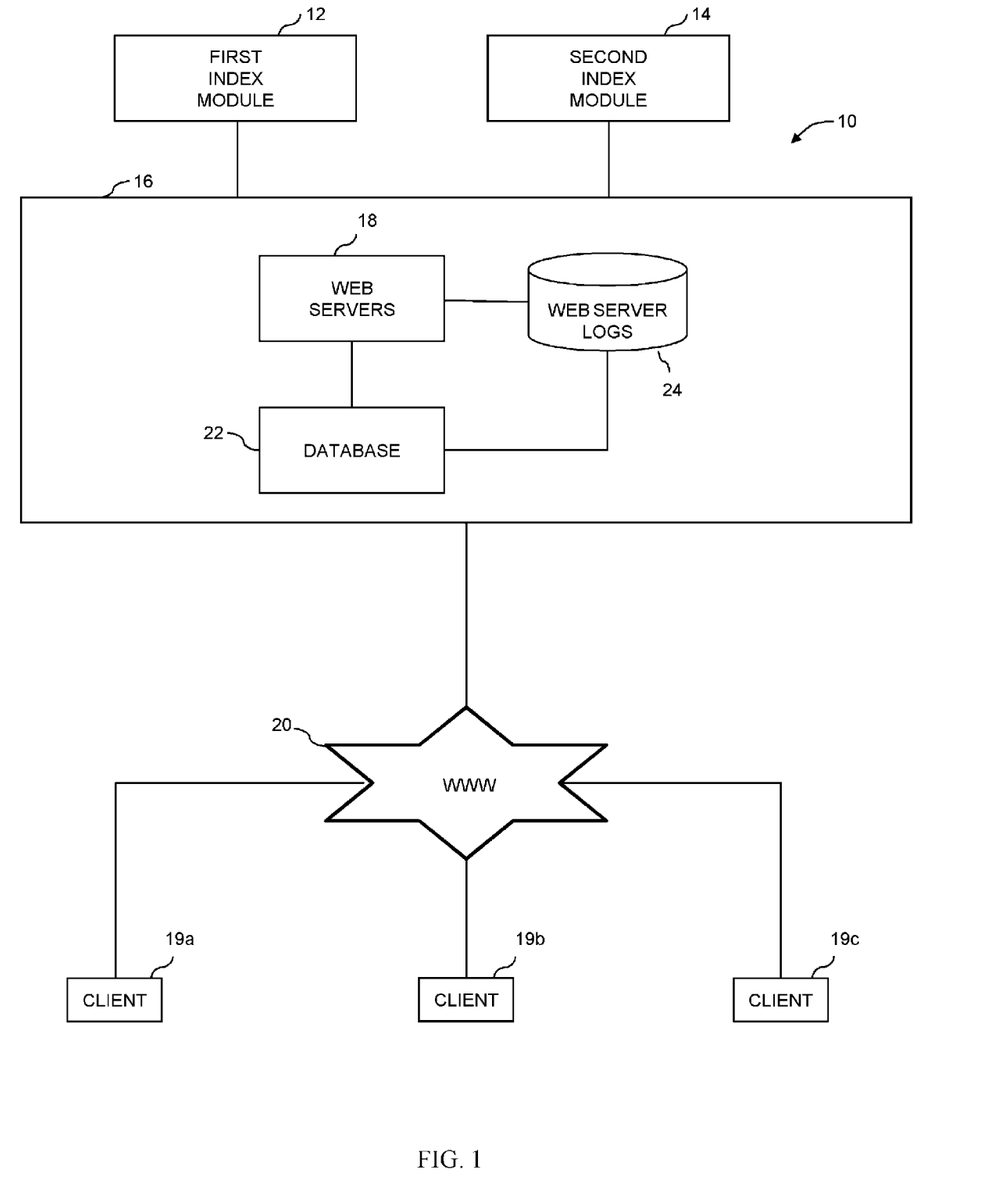
FIG. 1 is a schematic view of a system for dynamically monetizing keyword values.

Referring now to FIG. 1, a system embodying the principles of the present application is illustrated therein and designated at 10. The system 10 comprises a first index module 12 and a second index module 14 in communication with at least one website 16 (e.g., www.yahoo.com) comprising a plurality of web servers 18. The web servers 18 may include search engines (not shown) for processing and receiving search requests comprising one or more keywords. Search requests are generally conducted by users via client devices 19a, 19b, and 19c communicatively coupled to a network 20, which may include a connection to one or more local and/or wide area networks, such as the Internet. Upon receiving a search request for a subject from a user using their client device, a web server may return a web page containing links to documents related to the search request.

The web servers 18 may be communicatively linked to at least one database 22 configured to store events pertaining to a given subject. For instance, the database may include logs 24 of events (e.g., search logs, access logs, click logs, etc.) recorded or logged by one or more of the web servers 18. Details as to how logs of events are recorded are described in Yoo. Recorded events may include page hits, search requests, clicks, downloads, purchases, or any other recordable actions. Thus, the database 22 may be used to measure traffic at the website 16, where the term "traffic" refers to a count, or approximate count, of the events that occurred for a given subject.

"Traffic" might be a raw count of the number of events, unnormalized or otherwise, but traffic might also be measured not with one count per event, but one count per unique user (i.e., even if a particular user makes multiple requests, only one request is counted) or one count per unique user per time period might also be the measure of counting traffic. Traffic can be unnormalized, such as integer counts for the number of events, or can be normalized for a topic, term, or category. One purpose for normalization is to place the number in a suitable value range for presentation or other processing.

Figure 2:
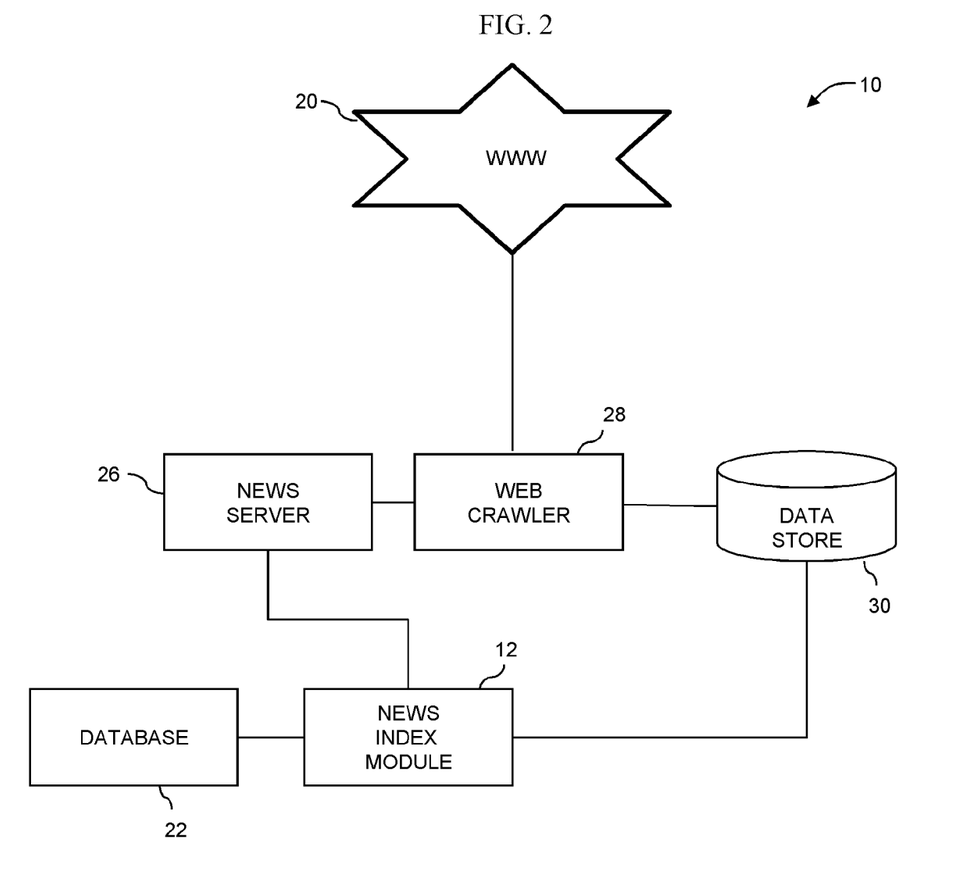
FIG. 2 is a schematic view of the system according to one embodiment of the application.

The web servers 18 may be configured to provide information relating to various topics (e.g., news, sports, weather, entertainment, etc.), with each web server being directed to processing search requests for a distinct topic. As depicted in FIG. 2, for example, one of the web servers 18 may be a "news" server 26 configured to provide news updates on current events and top stories, such as "Yahoo! News," "MSN News," "Fox News," etc. The news server 26 may include a web crawler 28 for retrieving news-related data from the network. For instance, the web crawler 28 may be programmed to actively retrieve such data by crawling any type of news source available on the network 20, such as, but not limited to, news related search servers, e.g., www.CNN.com, www.nytimes.com, www.newsweek.com, etc. As used herein, the term "data" is intended in its broadest sense, and may refer to any readable and/or storable content, such as, but not limited to, an online news story, video, comment, a web page, a website, web documents, etc. The web crawler 28 may store the crawled data into a data store 30 in communication with the news server 26. The data store 30 may be implemented as any type of data storage structure capable of providing for the retrieval and storage of a variety of data types. For instance, the data store 30 may comprise one or more accessible memory structures such as a database, CD-ROM, tape, digital storage library, etc.

In general, when a user conducts a search request for a subject via the news server 26, the news server 26 may return a list of relevant web documents (e.g., news articles) associated with the subject, wherein the list of web documents is generated from news-related data stored in the data store 30. The determination of relevant web documents may be based on various methods known to those of skill in the art. For instance, the news server 26 may generate the list of web documents based on a comparison between keywords contained in the web documents and the one or more keywords forming the search request.

Additionally, in order to provide users with the most current results, the data store 30 may be periodically updated with "fresh" data retrieved by the web crawler 28. For example, techniques known to those of skill in the art may be utilized to program the web crawler 28 to automatically identify and gather fresh data, such as, but not limited to, data that has been recently updated (e.g., developing news stories), data that has been recently added and made available to the network (e.g., breaking news stories), etc. Thus, the news server 26 may be configured to generate a list of fresh or new web documents based on news content crawled during a specified period of time. For instance, the list of web documents may be limited to web documents that have been retrieved by the web crawler 28 in the past hour, day, week, etc.

In an exemplary embodiment, the first index module 12 is configured to generate a first index for a given subject being searched by users via at least one of the web servers 18. More particularly, the first index module 12 comprises a "news" index module 12 in communication with the news server 26 and configured to generate a "news" index score for a given subject being searched by users via the news server 26. The news index score for a given subject may be calculated as a function of the total number of web documents the news server 26 generates in response to a search request for that subject and an access frequency associated with each of the web documents. The news index module 12 determines the access frequency associated with each web document by analyzing the database 22.

In general, the access frequency may be based on any measurable factor, such as the amount of time one or more unique users spent viewing a given document, the amount of times a particular document was downloaded by one or more unique users, etc. In one aspect of this embodiment, the access frequency for a given web document is based on a frequency each web document is accessed within the website 16. For example, the news index module 12 may analyze all of the click logs in the database 22 to determine the "clickability" of a given document (i.e., the frequency a given document is selected when displayed to a user). Thus, the access frequency for a given web document may be based on the total number of times a link to a given web document was selected (e.g., clicked) by one or more unique users visiting the website 16 during a predetermined period of time.

Accordingly, the news index for a given subject may be viewed as a metric calculated as a function of two factors, as denoted by the following equation:

$$Z=f(X)+g(Y),$$

where:

Z is the news index score for a given subject;

f(X) is the total new "news" content (e.g., web documents) generated for a given subject; and g(Y) is the access frequency associated with each new "news" content.

Additionally, the news index score Z for a given subject may be a metric calculated as a weighted sum of f(X) and g(Y). More particularly, f(x) and g(y) may be multiplied by constant multipliers C and K, respectively, where the values corresponding to C and K are weighted differently based on various parameters. For instance, the news index module 12 may calculate the news index score for a given subject according to certain user preferences (e.g., age, gender, geographic location, etc.), or according to certain web content (e.g., content crawled from blogs). Whether or not a constant multiplier is applied in calculating new index scores for a set of subjects, the news index module 12 may apply a normalization factor to the news index scores, as will be explained in greater detail below. Furthermore, the news index module 12 may be configured to periodically update the news index scores for a set of subjects.

Continuing now with FIG. 1, the second index module 14 is configured to generate a second index for a given subject being searched by users via at least one of the web servers 18. More particularly, the second index module 14 comprises a "buzz" index module 14 in communication with the web servers 18 and configured to generate a "buzz" index score for a given subject being searched by users via the web servers 18. The buzz index score is a metric representing a level of interest (i.e., "buzz") in a given subject, such as a movie, a person, product, place, or event, cultural phenomena, etc. As used herein, the term "buzz" refers to a measurement of user interest in a particular subject, and the term "subject" refers generally to any topic, search term, category, etc. In essence, the buzz index scores are based on corresponding levels of popularity, and can be used to identify cultural trends, track interest in specific brands, measure the effectiveness of marketing campaigns, etc.

The buzz index module 14 may calculate the buzz index score for a given subject based on various factors. For instance, the buzz index score for a given subject may be calculated as a percentage based on a total number of unique users searching for that subject (or viewing a page related to that subject), divided by a sum of users searching anywhere on the website 16. The buzz index scores may also be calculated without regard as to whether each recorded event originated by a unique user. Various embodiments and methods for calculating the buzz index scores are described in more detailed in Yoo.

In one variation, the buzz index score associated with a particular term or category is the number of users searching that term, or viewing a page related to that term, divided by a sum of users searching, where the sum can be the sum of users searching over all subcategories in a category, sum of users searching over all terms in a category, or the sum of all users searching anywhere on the website 16. As with the news index scores, a normalization factor might be applied to all terms being compared so that the buzz index scores are easily represented. For example, if there are four terms in a category, 100 total unique user hits on those four terms (25, 30, 40 and 5, respectively) out of one million total unique users, a normalization factor of 100,000 might be applied so that the buzz index scores are 2.5, 3, 4 and 0.5, instead of 0.000025, 0.00003, 0.00004 and 0.000005. Normalization can also be used when determining the "buzz" surrounding one company or product against an index of other companies or products within a particular market segment or product category.

Figure 3:
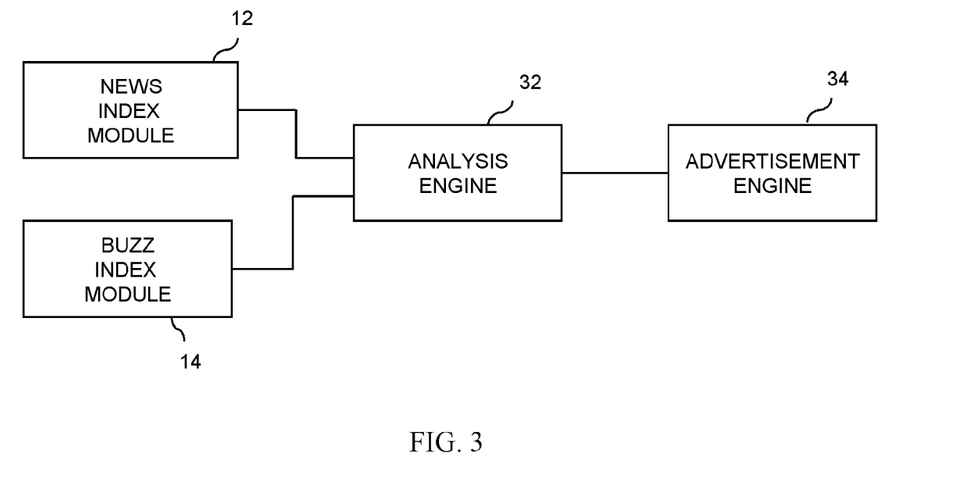
FIG. 3 is a schematic view of the system according to yet another embodiment of the application.

Referring now to FIG. 3, the system 10 of the present application may also comprise an analysis engine 32 in communication with the "news" index module 12 and the "buzz" index module 14. The analysis engine 32 is configured to correlate the news index score for a given subject with the buzz index score for that subject to predict a change or trend in the second index score based on the first index score. Such a change may be a sudden drop or a predetermined decrease in the buzz index score, or a sudden spike or a predetermined increase in the buzz index score. For example, the analysis engine 32 may approximate a future spike or increase in the buzz index score based on an earlier spike or increase in the news index score. More particularly, the analysis engine 32 is configured to monitor the news index scores for a set of subjects (e.g., subjects searched by users via the news server 26 during a certain period of time), and identify subjects which have experienced a change or trend (e.g., a series of spikes during a certain period of time of the year) in their corresponding news index score.

Figure 4:
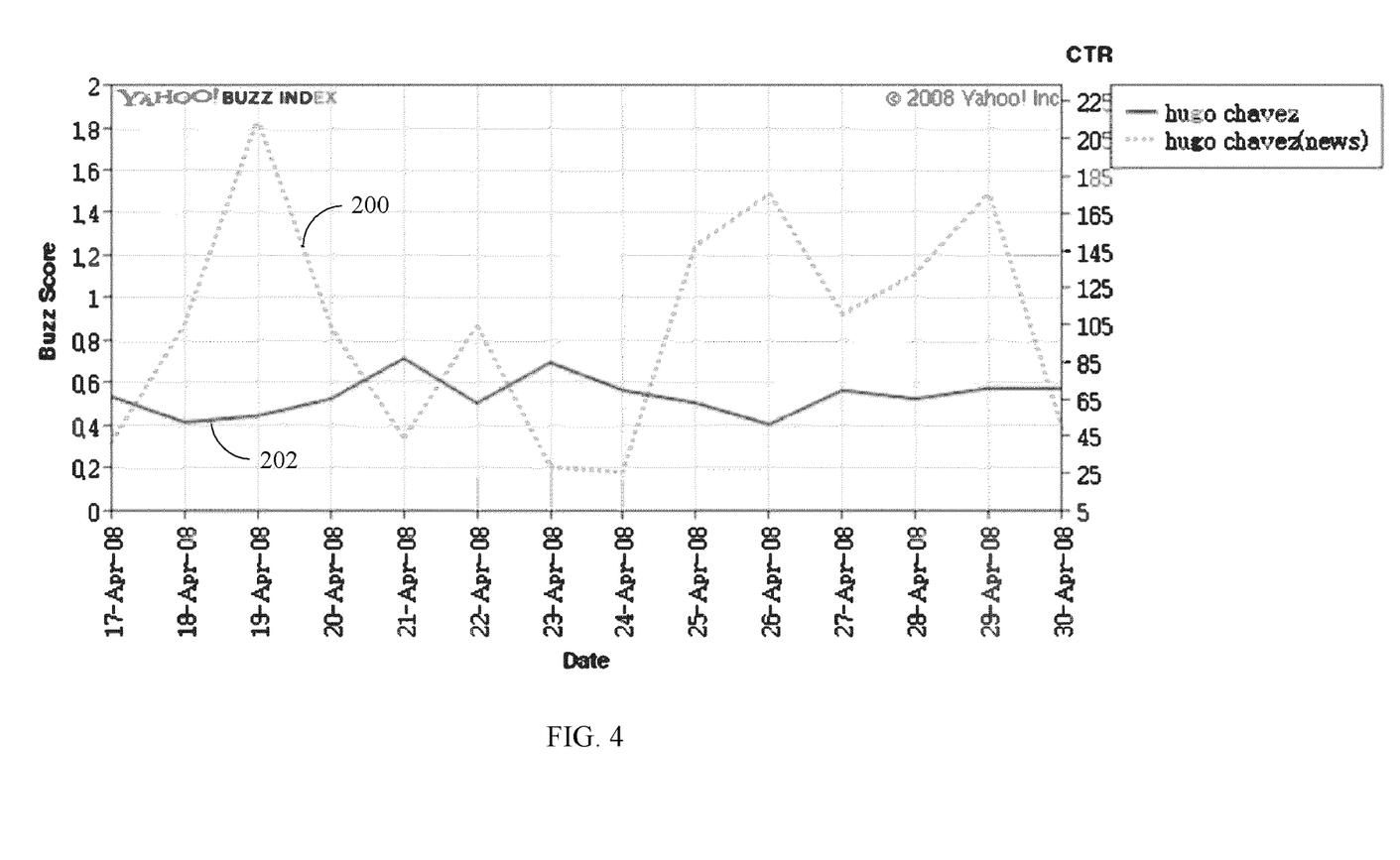
FIG. 4 is a graph plotting a first index score for a given subject versus a second index score for that subject.

For instance, if the news index score for a given subject spikes or increases by a predetermined percentage, the analysis engine 32 can predict that the buzz index score for that subject will experience an increase within an approximated period of time. The graph depicted in FIG. 4, for example, illustrates a correlation between the news and buzz index scores for the term "Hugo Chavez" during the time period ranging from Apr. 17, 2008 to Apr. 30, 2008. In FIG. 4, Lines 200 and 202 represent the news index scores and the buzz index scores for "Hugo Chavez," respectively. Looking at FIG. 4, it can be seen that spikes in the news index scores are consistently followed by spikes in the buzz index scores. On Apr. 19, 2008, for example, the news index score experiences a spike, which is followed by a spike in the buzz index score shortly after on Apr. 21, 2008. As seen on the graph, this trend continues for the rest of the month, as the spikes in the news index scores consistently precede the spikes in the buzz index scores.

Accordingly, the analysis engine 32 can utilize the news index scores to predict higher search volumes for a set of subjects. Furthermore, the analysis engine 32 can be configured to identify an event corresponding to an earlier change in the news index score for a subject. In other words, if the news index score for a particular subject experiences a change, the analysis engine 32 may identify what event or string of events caused or contributed to that change. By way of example, if the news index score for the term "San Diego" experiences a spike or suddenly increases, the analysis engine 32 may identify one or more new web documents (e.g., breaking news articles relating to a recent earthquake in San Diego) associated with "San Diego."

In yet another embodiment, the system 10 may further comprise an advertisement engine 34 in communication with the analysis engine 32. The advertisement engine 34 may be configured to dynamically monetize bid prices for keywords being searched by users visiting the website 16. For instance, advertisers may bid on keywords associated with advertisements to be displayed on the website 16. Thus, the advertisement engine 34 may initially assign a bid price for each keyword based on a variety of factors (e.g., expected revenue). However, if the news index score for a given subject increases by a predetermined amount, it can be predicted that the subject will experience higher search volumes in the near future, and consequently, higher click volumes. Similarly, if the buzz index score for a given subject unexpectedly increases by a predetermined amount, it is likely that the subject is experiencing higher click volumes and may continue to do so. Since higher click volumes typically yield increased revenue, the advertisement engine 34 may utilize the news index scores and/or buzz index scores to automatically update the pre-assigned bid prices in a manner configured to enhance revenue. It should be understood that the advertisement engine 34 may utilize any now known or later discovered algorithms and models to assign and update bid prices for keywords.

Furthermore, the news index scores and the buzz index scores may be published on the website 16 for public and/or private online viewing, in a manner similar to that done on the Yahoo! Buzz website (buzz.yahoo.com). Thus, advertisers and other businesses may determine what keywords to bid on based on a subject's news index score. Additionally, if a user such as an editor, for example, is interested in analyzing a subject having a high buzz index score, the user may refer to the news index. For instance, the user may view the subject's historical news index scores to determine if and when the subject's news index score experienced an increase, and what event or string of events caused or contributed to the increase.

It should be understood that the above examples are only illustrative and not restrictive, as those of skill in the art will understand that the news and buzz index scores can be used for numerous purposes. It should also be understood that the present application is not limited to a particular website or collection of websites, although many of the examples show examples from a specific website, namely the Yahoo! website.

Figure 5:
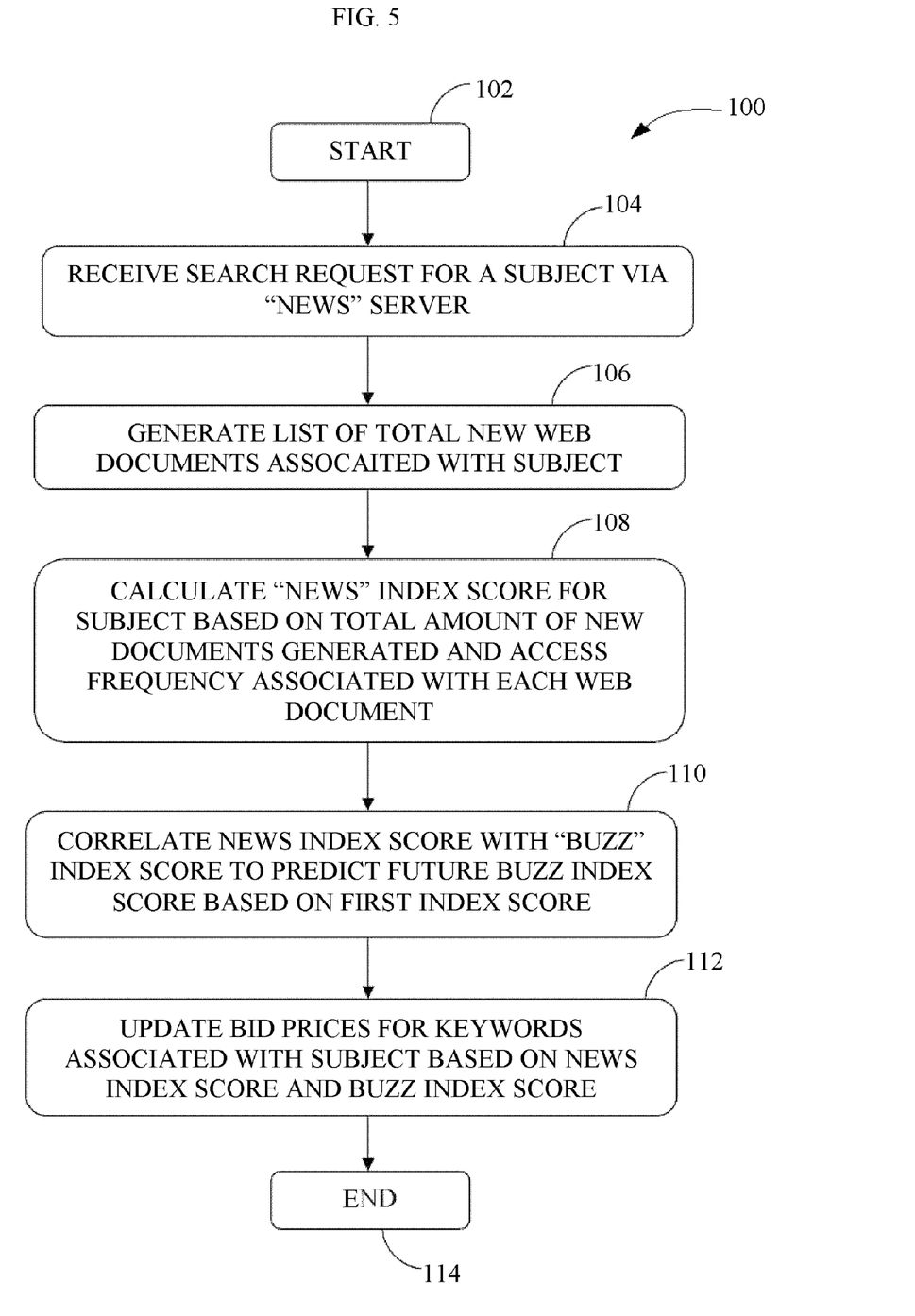
FIG. 5 is a flowchart illustrating a method for dynamically monetizing keyword values.

Referring now FIG. 5, a method 100 for dynamically monetizing keyword values based on correlation between one or more indices starts in block 102. A web server such as, but not limited to, the "news" server discussed above, receives a search request for a subject from a user, as denoted by block 104. In block 106, the web server generates a list of new web documents associated with the subject and displays the list on a web page to the user. The web server 26 may generate the list of web documents based on a total amount of new web documents that a web crawler has retrieved during a specified period of time (e.g., the past hour, day, week, etc.). In block 108, a news index score for the subject is calculated based on the list of web documents and an access frequency associated with each web document. The access frequency associated with each web document may be based on the frequency each web document is accessed (e.g., viewed, clicked, etc.) within a website or network.

Continuing with block 110, the news index score for a given subject is correlated with a buzz index score for the subject to predict a future spike or increase in the buzz index score based on an earlier spike or increase in the news index score. The buzz index score for the subject is calculated independently of the first index score and is generally based on a corresponding level of popularity. Various embodiments and methods for calculating the buzz index scores are described in more detailed in Yoo. In block 112, bid prices for keywords associated with the subject are updated to enhance revenue, wherein the updated bid prices are based on the first index scores and the buzz index scores. The method ends in block 114.

Figure 6:
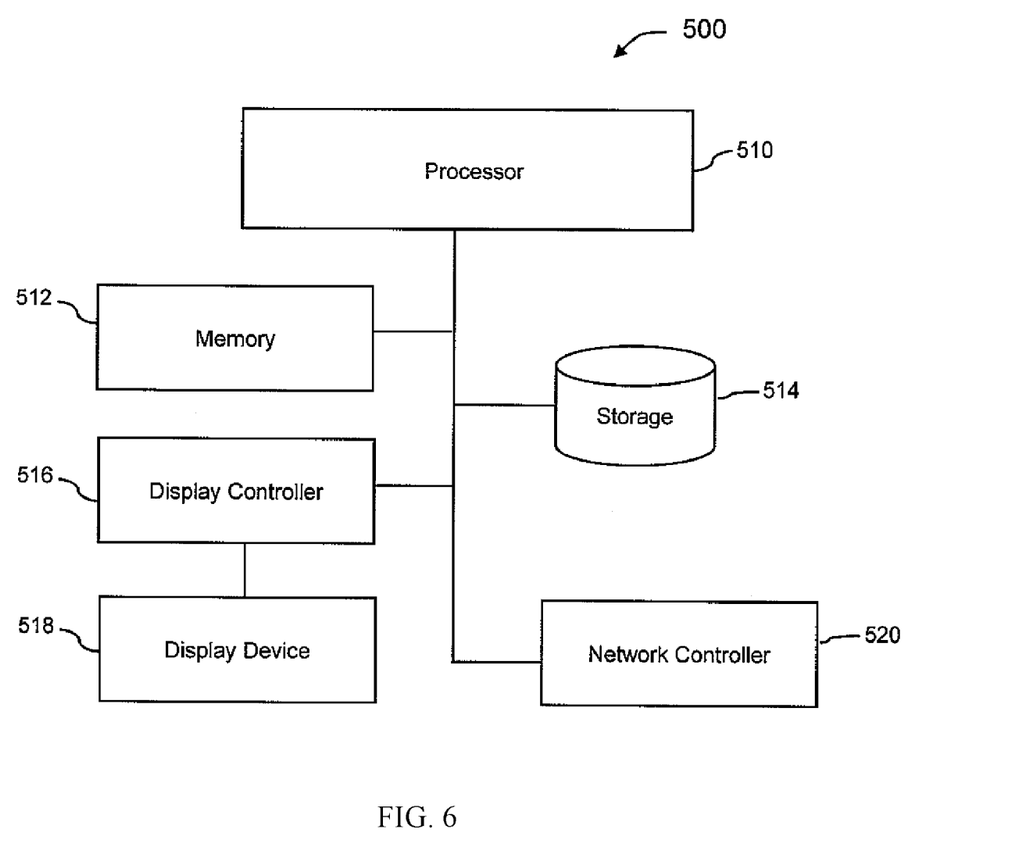
FIG. 6 is a schematic view of a computer system for implementing the methods described.

Any of the modules, servers, or engines described may be implemented in one or more general computer systems. One exemplary system is provided in FIG. 6. The computer system 500 includes a processor 510 for executing instructions such as those described in the methods discussed above. The instructions may be stored in a computer readable medium such as memory 512 or a storage device 514, for example a disk drive, CD, or DVD. The computer may include a display controller 516 responsive to instructions to generate a textual or graphical display on a display device 518, for example a computer monitor. In addition, the processor 510 may communicate with a network controller 520 to communicate data or instructions to other systems, for example other general computer systems. The network controller 520 may communicate over Ethernet or other known protocols to distribute processing or provide remote access to information over a variety of network topologies, including local area networks, wide area networks, the Internet, or other commonly used network topologies.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

I claim:

1. A system for dynamically monetizing keyword values based on a correlation between two or more indices, the system comprising:
   a first index module configured to generate a first index for a subject being searched by users via a web server associated with a website, the web server being configured to receive and process a plurality of search requests;
   a second index module configured to generate a second index for the subject based on a corresponding level of popularity; and
   an analysis engine in communication with the first index module and the second index module, the analysis engine being configured to correlate the first index with the second index to predict a change in the second index based on the first index, wherein the first index is a metric calculated as a function of a total number of web documents generated in response to a search request for the subject and an access frequency corresponding to each web document of the total number of web documents.

2. The system of claim 1, wherein the access frequency is based on a frequency that each web document of the total number of web documents is accessed within the website.

3. The system of claim 1, wherein the access frequency is based on a frequency that each web document of the total number of web documents is accessed within a network.

4. The system of claim 1, further comprising a web crawler in communication with the web server and configured to actively retrieve data from a network, the data including at least the total number of web documents generated in response to the search request.

5. The system of claim 4, wherein the total number of web documents is generated from the data retrieved by the web crawler during a predetermined period of time.

6. The system of claim 1, wherein the second index is a metric calculated as a percentage of a total number of users searching the subject via the website.

7. The system of claim 1, wherein the second index is a metric proportional to a total number of searches conducted for the subject via the website.

8. The system of claim 1, wherein the second index is a metric calculated as a function of a total number of users searching the subject via the website and a total number of searches conducted via the website.

9. The system of claim 1, wherein the change in the second index corresponds to an increase in the second index.

10. The system of claim 1, wherein the analysis engine predicts the change in the second index based on a change in the first index.

11. The system of claim 10, wherein the analysis engine is further configured to analyze the first index to identify an event corresponding to the change in the first index.

12. A system for dynamically monetizing keyword values based on a correlation between two or more indices, the system comprising:
   a first index module configured to generate a first index for a subject being searched by users via a web server associated with a website, the web server being configured to receive and process a plurality of search requests;
   a second index module configured to generate a second index for the subject based on a corresponding level of popularity;
   an analysis engine in communication with the first index module and the second index module, the analysis engine being configured to correlate the first index with the second index to predict a change in the second index based on an earlier change in the first index;
   an advertisement engine in communication with the analysis engine and configured to dynamically update bid prices of keywords associated with the subject based on the first index; and
   a web crawler in communication with the web server and configured to actively retrieve data from a network, the data including at least the total number of web documents generated in response to the search request;
   wherein the first index is a metric calculated as a function of a total number of web documents generated in response to a search request for the subject and an access frequency corresponding to each web document of the total number of web documents.

13. A method for dynamically monetizing keyword values based on a correlation between one or more indices, the method comprising:
  generating a first index for a subject being searched by users via a web server associated with a website, the web server being configured to receive and process a plurality of search requests;
  independently generating a second index for the subject based on a corresponding level of popularity; and
  correlating the first index with the second index to predict a change in the second index based on the first index, wherein the first index is a metric calculated as a function of a total number of web documents generated for the subject in response to a search request and an access frequency corresponding to each web document of the total number of web documents.

14. The method of claim 13, further comprising analyzing a database associated with the website to determine the access frequency.

15. The method of claim 14, wherein the access frequency is based on the frequency that each web document of the total number of web documents is accessed within the website.

16. The method of claim 13, further comprising actively crawling a network to retrieve data, the data including at least the total number of web documents generated in response to the search request.

17. The method of claim 16, wherein the total number of web documents is generated from the data retrieved during a predetermined period of time.

18. The method of claim 13, wherein the second index is a metric calculated as a percentage of a total number of users searching the subject via the website.

19. The method of claim 13, further comprising using the first index to dynamically update bid prices of keywords associated with the subject.

20. The method of claim 13, wherein the change in the second index is based on a change in the first index.

21. In a computer readable storage medium having stored therein instructions executable by a programmed processor for dynamically monetizing keywords values, the storage medium comprising instructions for:
  generating a first index for a subject being searched by users via a web server associated with a website, the web server being configured to receive and process a plurality of search requests;
  independently generating a second index for the subject based on a corresponding level of popularity; and
  correlating the first index with the second index to predict a change in the second index based on the first index, wherein the first index is a metric calculated as a function of a total number of web documents generated for the subject in response to a search request and an access frequency corresponding to each web document of the total number of web documents.

22. The computer readable storage medium of claim 21, wherein the access frequency is based on the frequency that each web document of the total number of web documents is accessed within the website.

23. The computer readable storage medium of claim 21, further comprising actively crawling a network to retrieve data, the data including at least the total number of web documents generated in response to the search request.

24. The computer readable storage medium of claim 23, wherein the total number of web documents is generated from the data retrieved during a predetermined period of time.

25. The computer readable storage medium of claim 21, wherein the second index is a metric calculated as a percentage of a total number of users searching the subject via the website.

26. The computer readable storage medium of claim 21, further comprising using the first index to dynamically update bid prices of keywords associated with the subject.

27. The computer readable storage medium of claim 21, further comprising analyzing the first index to identify an event corresponding to the earlier increase in the first index.

* * * * *